2,707,182

METALLIZABLE TRISAZO DYESTUFFS

Marcel Reding, Basel, and Werner Bossard, Riehen, near Basel, Switzerland, assignors to J. R. Geigy A. G., Basel, Switzerland, a Swiss firm No Drawing. Application September 14, 1953, Serial No. 380,127

Claims priority, application Switzerland October 16, 1952

8 Claims. (Cl. 260—173)

The present invention concerns the production of new, metallisable trisazo dyestuffs, the coppered cellulose dyeings of which have very good fastness properties. They dye cellulose material by the direct dyeing method in yellow-green, green to olive green shades which are not changed much by the coppering process. Coppered cellulose dyeings are obtained according to the composition of the dyestuff, some of which have such excellent fastness to washing that they withstand repeated soap washings. The dyestuffs according to this invention supplement the group of fast, copperable trisazo dyestuffs at a point where at present there are not sufficient dyestuffs to fulfill the high demands made upon them.

It has now been found that valuable trisazo dyestuffs of the type

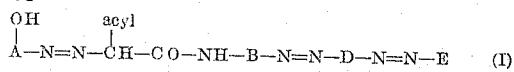

can be obtained, if a diazotised amino compound of the benzene series (A) containing a hydroxyl group or a substituent which can be converted into a hydroxyl group in the o-position to the diazo group, is coupled with a new middle component of the composition

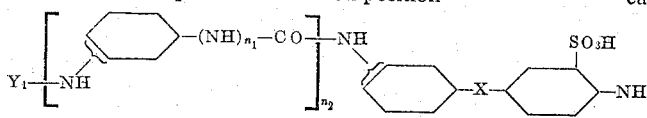

which middle component will be more fully described below, diazotising the aminoazo dyestuff so obtained and coupling the diazo compound in an acid medium with a 1-aminonaphthalene compound (D) coupling in the 4-position which contains a substituent in the 2-position suitable for the formation of the metal complex, in particular an alkoxy group. This can also be further substituted if desired, preferably by a carboxyl group. The aminodisazo dyestuff is then again diazotised and coupled in an alkaline medium with a 2-acylamino-6-hydroxynaphthalene-8-sulphonic acid (E).

In this middle component of the above Formula II containing the radical B, each of $n_1$ and $n_2$ represents an integer of the value of 0 and 1, X represents the direct carbon-to-carbon linkage or a CO—NH or a

NH—CO—NH group, one $Y_1$ and $Y_2$ represents hydrogen and the other represents an acyl—$CH_2$—CO group, wherein "acyl" means an alkoyl or a benzoyl radical. All the benzene rings in this formula as well as in all formulae derived therefrom can contain the non-ionogenic substituents usual in azo dyestuffs, for example, halogen, alkyl, or alkoxy groups. These new middle components used according to the present invention (corresponding to B) are monoprimary amino compounds which are derived from polynuclear, substantive diamino compounds of the diphenyl, diphenyl urea and benzanilide series having a sulphonic acid group standing in the o-position to an amino group and wherein an amino group is acyloacetylated. The 4,4'-diaminodiphenyl - 3 - sulphonic acids, 4,4'- or 4,3'-diaminodiphenyl urea-3-sulphonic acids and 4-(3'- or 4'-aminobenzoylamino) - 1 - aminobenzene-2-sulphonic acids can be used chiefly as starting materials for the production of the middle components. Also derivatives of these compounds can be used, one amino group of which is substituted by a 3- or 4-aminobenzoyl or aminophenylcarbamyl group, but the dinuclear compounds are more suited to the process of the present invention. The further substitution of the benzene rings has been dealt with above. If acyloacetylating agents, e. g. diketene is reacted in the cold with the aqueous solutions of their alkali salts then, in a single reaction, only the amino group in the benzene ring having no sulphonic acid groups is acyloacetylated. The middle components so obtained produce trisazo dyestuffs according to the present invention which are particularly fast to acid. It is also possible to react acyloacetylating agents in the warm with the aqueous solutions of the alkali salts of 4-(3'- or 4'-nitrobenzoyl or nitrophenylcarbamylamino)-1-aminobenzene-2-sulphonic acids, preferably diketene at 40–60° C., until the primary amino groups have disappeared and thus, after reduction of the nitro groups to amino groups, middle components of Formula II usable according to the process of the present invention are obtained. In these compounds also the primary amino groups can again be acylated with 3- or 4-nitrobenzoyl chloride or with 3- or 4-nitrophenyl isocyanate and then the nitro groups can be reduced to primary amino groups. However, in this group also, dinuclear compounds are to be preferrd to polynuclear.

Particularly pure trisazo dyestuffs according to the present invention are obtained with such middle components of the general Formula II which have a benzene ring wherein the substituents as defined are in the m-position.

If diazotised o-hydroxyamino compounds of the benzene series are reacted in an alkaline medium with compounds of the Formula II, the coupling occurs in the acyloacetyl radical and metallisable amino-monoazo dyestuffs which can be further diazotised are obtained.

As starting components, those 2-amino-1-hydroxybenzene compounds usable in metallisable azo dyestuffs can be used. These compounds can contain further substituents, e. g. halogen, alkyl, alkoxy, carboxyl sulphonic acid, sulphonic acid amide and carboxylic acid amide groups organically substituted at the nitrogen atom, alkyl sulphonyl, aryl sulphonyl and acylamino groups.

2-alkoxy-1-aminonaphthalene compounds coupling in the 4-position can be used as the second coupling components D, e. g. 1-amino-2-methoxy- or ethoxy-naphthalene, 1-amino-2-naphthylglycolic acid and derivatives thereof sulphonated in the 6- or 7-position of the naphthalene ring. 1-amino - 2 - naphthyl-glycolic acid often has a favourable influence on the drawing power of the trisazo dyestuffs according to the present invention, and is therefore, to be preferred.

The 2 - acylamino - 6 - hydroxynaphthalene - 8 - sulphonic acids used as end components E can contain as acyl radicals alkoyl radicals derived from lower fatty acids which can be further substituted, e. g. acetyl-, propionyl, butyryl, chloracetyl, 2-bromopropionyl, methoxyacetyl, dimethylacryl, succinyl radicals or aroyl radicals, preferably of the benzene series, e. g. benzoyl, 4- or 2-methyl- or chlorobenzoyl, 4- or 3-aminobenzoyl, 4- or 3-acetamidobenzoyl, 4-chloro or methoxy or methyl-3-aminobenzoyl, 4-methoxy- or ethoxybenzoyl radicals, further radicals of alicyclic or heterocyclic carboxylic acids as well as acyl radicals derived from carbonic acid such as carbamyl and carbalkoxy radicals, e. g. the dimethylcarbamyl or a phenylcarbamyl group or the carbethoxy, carbomethoxy, the carbomethoxy-ethoxy group. The final coupling is advantageously performed in an alkaline medium in the presence of tertiary organic bases, e. g. in the presence of pyridine and homologues thereof.

The present invention, in its broadest sense, comprises trisazo dyestuffs of the general Formula I wherein B corresponds to the radical of a middle component of Formula II. More easily available are the dinuclear middle components of the Formula II, wherein $n_2$ has the value of 0. In a more valuable class of trisazo dyestuffs according to the present invention therefore, B represents the radical of a middle component of the general Formula III:

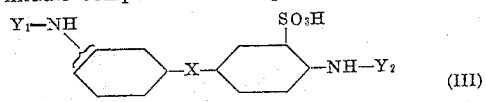

wherein the symbols have the meanings given for Formula II. Finally, middle components of the general Formula II which contain the radical:

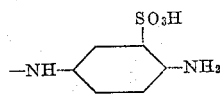

produce particularly valuable dyestuffs. Thus, in the most valuable group of dyestuffs according to the present invention of the general Formula II, B represents the radical of a compound of the general Formula IV

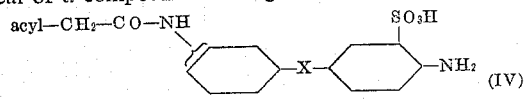

wherein X represents the groups CO—NH or

NH—CO—NH

The trisazo dyestuffs of the invention can also be defined as corresponding to the formula

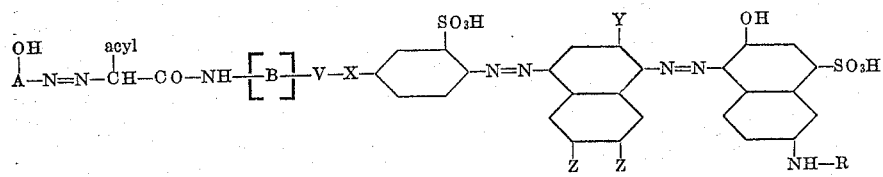

wherein A represents an aromatic radical of the benzene series containing the hydroxyl group in the o-position to the azo linkage, each of $n$ and $m$ is one of the numbers 0 and 1, B stands for the group

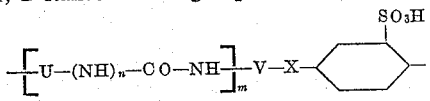

each of U and V represents an aromatic radical of the benzene series in which the bonds shown stand in other than the o-position of said aromatic radicals and which are free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group, and R represents a carboxylic acid acyl radical bound directly to the adjacent —NH— group by the —CO— group.

They may also be defined as corresponding to the formula

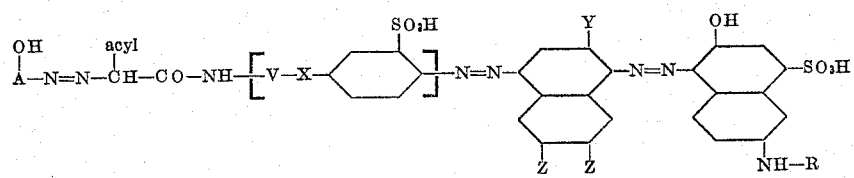

wherein A represents an aromatic radical of the benzene series containing the hydroxyl group in the o-position to the azo linkage, V represents an aromatic radical of the benzene series in which the bonds shown stand in other than the o-position of said aromatic radical and which is free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group, and R represents a carboxylic acid acyl radical bound directly to the adjacent —NH— group by the —CO— group.

In the form of their alkali salts, the new trisazo dyestuffs dissolve in hot water with a green colour and they dye cellulose fibres direct from a dyebath containing Glauber's salts in olive green, yellow-green to green shades. The shade is only slightly altered on after-treating the cellulose dyeing with agents giving off copper, on the other hand the fastness to wet and light is considerably improved. The coppering process can be performed in a neutral to weakly acid medium in the dyebath or in a fresh bath with the usual copper salts such as, e. g. copper acetate or copper sulphate. If desired, copper compounds can be used which are stable to alkali such as are obtained by reacting copper sulphate with sodium tartrate in a soda-alkaline bath.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

18.7 parts of 2-amino-1-hydroxybenzene-4-methyl sulphone are dissolved with 15 parts of concentrated hydrochloric acid in 200 parts of water and diazotised at 10° with 6.9 parts of sodium nitrite. The resulting suspension is poured into a solution of 41 parts of 5-(3'-acetoacetylaminobenzoylamino) - 2 - aminobenzene - 1-sulphonic acid in 400 parts of water and 24 parts of sodium bicarbonate. On completion of the coupling the yellow monoazo dyestuff is salted out and filtered off. The filter cake is dissolved in 1000 parts of water and 6.9 parts of sodium nitrite are added. A yellow diazo suspension is obtained by the dropwise addition of 40 parts of concentrated hydrochloric acid at 10–15°, which is made weakly acid to Congo red after stirring for 4 hours with 5 parts of sodium carbonate. It is then coupled with a solution of 21.7 parts of 1-amino-2-naphthyl-glycolic acid and 20 parts of sodium acetate. To accelerate the reaction, 4 parts of sodium carbonate are added to keep the reaction slightly acid. The disazo dyestuff formed is dissolved with 5 parts of caustic soda, mixed with 400 parts of sodium chloride, 60 parts of concentrated hydrochloric acid and diazotised with 8.2 parts of sodium nitrite at 20°. On completion of the diazotisation, the diazo compound is filtered off and washed. It is then coupled with 34.3 parts of 2-benzoyl-amino-6-hydroxynaphthalene-8-sulphonic acid in 200 parts of water in the presence of 150 parts of pyridine and 20 parts of sodium carbonate.

The green trisazo dyestuff of the formula:

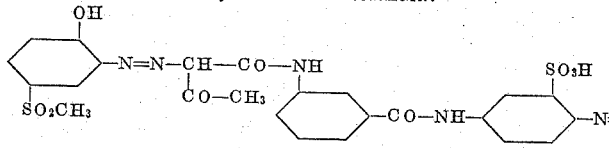

is precipitated with a little sodium chloride, filtered off and freed from adhering impurities by washing.

It is a dark powder which dissolves in water with a

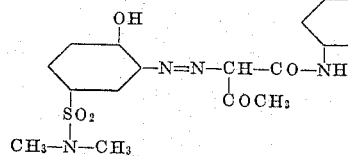

green and in concentrated sulphuric acid with an olive green colour. It dyes fibres from natural or regenerated cellulose in vivid yellowish-green shades. The dyeings are made fast to light, washing and acid by after-treatment with copper salts.

If, in this example 10.9 parts of 2-amino-1-hydroxybenzene or 12.5 parts of 4-methyl-2-amino-1-hydroxybenzene or 18.9 parts of 2-amino-1-hydroxybenzene-4-sulphonic acid or 20.5 parts of 6-methyl-2-amino-1-hydroxybenzene-4-sulphonic acid or 22.4 parts of 6-chloro-2-amino-1-hydroxybenzene-4-sulphonic acid or 21.6 parts of 2-amino-1-hydroxybenzene-4-sulphonic acid ethyl amide or 24.4 parts of 2-amino-1-hydroxybenzene-4-sulphonic acid-diethylamide or 27.5 parts of 2-amino-1-hydroxybenzene-4-sulphonic acid-diethanolamide, or 21.6 parts of 2-amino-1-hydroxybenzene-4-sulphonic acid-dimethylamide or 18.8 parts of 2-amino-1-hydroxybenzene-4-sulphonic acid amide or 15.3 parts of 2-amino-1-hydroxybenzene-4-carboxylic acid or 20.8 parts of 2-amino-1-hydroxybenzene-4-carboxylic acid-diethylamide or 24 parts of 2-amino-1-hydroxybenzene-4-carboxylic acid-diethanolamide or 22.8 parts of 2-amino-1-hydroxybenzene-4-carboxylic acid-phenylamide or 22.2 parts of 6-chloro-2-amino-1-hydroxybenzene-4-methyl sulphone or 24.4 parts of 6-acetylamino-2-amino-1-hydroxybenzene-4-methyl sulphone are used instead of 18.7 parts of 2-amino-1-hydroxybenzene-4-methyl sulphone, analogous green trisazo dyestuffs are obtained which have similar properties.

*Example 2*

24.4 parts of 2-amino-1-hydroxybenzene-4-sulphonic acid-dimethylamide are dissolved at 50° with 7.5 parts of sodium carbonate in 500 parts of water. 6.9 parts of sodium nitrite are added and the solution is poured at 0° on to 30 parts of concentrated hydrochloric acid. The diazonium solution is poured into 40.6 parts of 3'-acetoacetylamino-4-amino-1.1'-diphenyl-urea-3-sulphonic acid in 400 parts of water and 24 parts of sodium bicarbonate. The yellow monoazo dyestuff is isolated, dissolved in 1000 parts of water and diazotised at 10–15° with 6.9 parts of sodium nitrite and 40 parts of concentrated hydrochloric acid. The diazonium compound neutralised with 4 parts of sodium carbonate is poured at 0–5° into a solution of 21.7 parts of 1-amino-2-naphthyl glycolic acid to which has been added 20 parts of sodium acetate. The reaction of the coupling is kept weakly acid by the addition of 5 parts of sodium carbonate. The violet disazo dyestuff dissolves with 5 parts of caustic soda and is further diazotised as described in Example 1. The isolated diazonium compound can be coupled with 34.8 parts of 6-hydroxynaphthyl-(2)-carbamic acid-methoxyethyl ester-8-sulphonic acid in 200 parts of water with the addition of 20 parts of sodium carbonate and 150 parts of pyridine to form the green trisazo dyestuff of the formula:

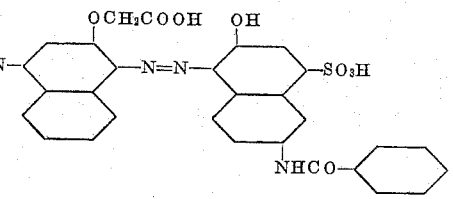

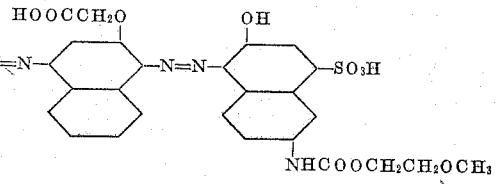

It is a dark powder which dissolves in water with a green and in concentrated sulphuric acid with an olive green colour. It dyes cotton, rayon, viscose, hemp and jute in green shades. After treatment with copper compounds according to one of the usual methods, the dyeings have very good fastness properties.

If in this example the 24.4 parts of 2-amino-1-hydroxybenzene-4-sulphonic acid dimethyl amide are replaced by 18.7 parts of 2-amino-1-hydroxybenzene-4-methyl sulphone, 10.9 parts of 2-amino-1-hydroxybenzene, 12.5 parts of 4-methyl-2-amino-1-hydroxybenzene, 18.9 parts of 2-amino-1-hydroxybenzene-4-sulphonic acid, 20.5 parts of 6-methyl-2-amino-1-hydroxybenzene-4-sulphonic acid, 22.4 parts of 6-chloro-2-amino-1-hydroxybenzene-4-sulphonic acid, 21.6 parts of 2-amino-1-hydroxybenzene-4-sulphonic acid-ethyl amide, 27.5 parts of 2-amino-1-hydroxybenzene-4-sulphonic acid-diethanolamide, 18.8 parts of 2-amino-1-hydroxybenzene-4-sulphonic acid amide, 15.3 parts of 2-amino-1-hydroxybenzene-4-carboxylic acid, 20.8 parts of 2-amino-1-hydroxybenzene-4-carboxylic acid-diethyl amide, 24 parts of 2-amino-1-hydroxybenzene-4-carboxylic acid-diethanol amide, 22.8 parts of 2-amino-1-hydroxybenzene-4-carboxylic acid-phenyl amide, 16.6 parts of 4-acetylamino-2-amino-1-hydroxybenzene, 24.4 parts of 6-acetyl-amino-2-amino-1-hydroxybenzene-4-methyl sulphone or 22.2 parts of 6-chloro-2-amino-1-hydroxybenzene-4-methyl sulphone, similar green trisazo dyestuffs are obtained which have similar properties.

*Example 3*

18.7 parts of 2-amino-1-hydroxybenzene-4-methyl sulphone are diazotised as described in Example 1, and the diazo compound is poured into a solution of 40.6 parts of 3'-acetoacetylamino-4-amino-1.1'-diphenyl urea-3-sulphonic acid in 400 parts of water and 30 parts of sodium carbonate. The monoazo dyestuff which has been isolated and 6.9 parts of sodium nitrite are dissolved in 1000 parts of water and the whole is poured at 10–15° on to 40 parts of concentrated hydrochloric acid. After stirring for 4 hours, the diazonium compound which precipitates is filtered off and added to a solution of 21.7 parts of 1-amino-2-naphthylglycolic acid in 600 parts of water to which has been added 20 parts of sodium acetate. The violet disazo dyestuff is further diazotised as described in Example 1, filtered, and coupled with a solution of 35.8 parts of 2-(3'-amino-benzoylamino)-6-hydroxynaphthalene-8-sulphonic acid in 200 parts of water in the presence of 20 parts of sodium carbonate and 150 parts of pyridine to form the trisazo dyestuff of the formula:

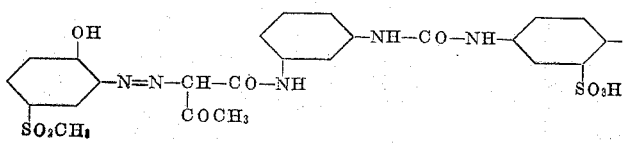

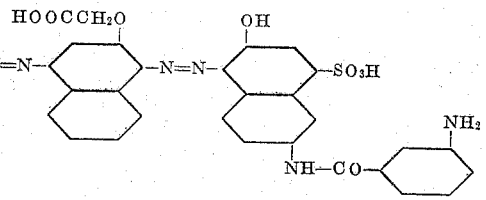

The dyestuff is precipitated with a little sodium chloride, filtered and washed with diluted sodium chloride solution. When dry, it is a dark powder which dissolves in water with a green and in concentrated sulphuric acid with a brown-olive colour. After treating with copper salts, dyeings on natural or regenerated cellulose are of green shades which have excellent fastness properties.

If in the above example the 35.8 parts of 2-(3'-aminobenzoylamino)-6-hydroxynaphthalene - 8 - sulphonic acid are replaced by 34.3 parts of 2-benzoylamino-6-hydroxynaphthalene-8-sulphonic acid or 28.1 parts of 2-acetylamino-6-hydroxynaphthalene-8-sulphonic acid or 35.8 parts of 2 - (4'-aminobenzoylamino)-6-hydroxynaphtalene-8-sulphonic acid or 39.3 parts of 2-(4'-chloro-3'-aminobenzoylamino)- 6 -hydroxynaphthalene-8-sulphonic acid or 37.9 parts of 2-(2'- or -4'-chlorobenzoylamino)-6-hydroxynaphthalene-8-sulphonic acid or 41.2 parts of 2 - (2'.4'-dichloro-benzoylamino)-6-hydroxynaphthalene-8-sulphonic acid or 37.2 parts of 2-(4'-methyl-3'-aminobenzoylamino)-6-hydroxynaphthalene-8-sulphonic acid or 38.8 parts of 2-(4'-methoxy-3'-aminobenzoylamino)-6-hydroxynaphthalene-8-sulphonic acid or 40 parts of 2-(3' - acetylaminobenzoylamino)-6-hydroxynaphthalene-8-sulphonic acid or 36.9 parts of 2-cinnamoylamino-6-hydroxynaphthalene-8-sulphonic acid or 33 parts of 2-furanoylamino-6-hydroxynaphthalene-8-sulphonic acid or 32.1 parts of 2-(β.β-dimethyl-acrylamino)-6-hydroxynaphthalene-8-sulphonic acid or 29.7 parts of 2-carbomethoxyamino-6-hydroxynaphthalene-8-sulphonic acid or 31.1 parts of 2-carbethoxyamino-6-hydroxynaphthalene-8-sulphonic acid, similar dyestuffs with the same properties are obtained.

*Example 4*

22.4 parts of 6-chloro-2-amino-1-hydroxybenzene-4-sulphonic acid are diazotised in the usual way and coupled with 42 parts of 3'-acetoacetylamino-4'-methyl-4-amino-1.1'-diphenyl urea-3-sulphonic acid in the presence of 16 parts of sodium carbonate. The yellow monoazo dyestuff which forms is salted out, filtered dissolved in 1000 parts of water and 7 parts of sodium nitrite are added. This solution is poured at 10–15° into 40 parts of concentrated hydrochloric acid. After 4 hours, the diazo compound is made weakly acid to Congo red with 5 parts of sodium carbonate and coupled with a solution of 21.7 parts of 1-amino-2-naphthylglycolic acid and 20 parts of sodium acetate in 600 parts of water. 4 parts of sodium carbonate are added until there is a weakly acid reaction to accelerate the coupling. The violet disazo dyestuff is further diazotised with 60 parts of hydrochloric acid and 8.2 parts of sodium nitrite at 20°, filtered and coupled with 28.1 parts of 2-acetylamino-6-hydroxynaphthalene-8-sulphonic acid and 20 parts of sodium carbonate in 200 parts of water, 150 parts of pyridine to form the trisazo dyestuff of the formula:

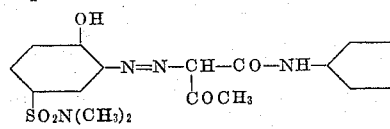
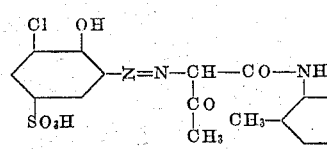

The dyestuff is a dark powder which dissolves in water with a green colour and in concentrated sulphuric acid with a greenish brown colour. It dyes natural and regenerated cellulose fibres in green shades. On after-treating with copper salts on the fibre the shade does not change much but the dyeings have very good washing, light and acid fastness properties. If in the above example the 42 parts of 3'-acetoacetylamino-4'-methyl-4-amino-1.1'-diphenyl urea-3-sulphonic acid are replaced by 40.6 parts of 3'- or 4'-acetoacetylamino-4-amino-1.1'-diphenyl urea-3-sulphonic acid, 39.1 parts of 1-(3'- or 4'- acetoacetylaminobenzoylamino) - 4 - aminobenzene-3-sulphonic acid, 42.6 parts of 1-(3'-acetoacetylamino-4'-chlorobenzoylamino)-4-aminobenzene-3-sulphonic acid, 40.5 parts of 1-(3'-acetoacetylamino-4'-methylbenzoylamino)-4-aminobenzene-3-sulphonic acid, 42.1 parts of 1-(3'- acetoacetylamino-4'-methoxybenzoylamino)-4-aminobenzene-3-sulphonic acid, 40.5 parts of 1-(4'-acetoacetylamino- 3'-methylbenzoylamino)-4-aminobenzene-3-sulphonic acid, 40.5 parts of 1-(3'- or -4'-acetoacetylaminobenzoylamino)- 4 -amino-5-methylbenzene-3-sulphonic acid, 42.1 parts of 1-(3'- or -4'-acetoacetylaminobenzoylamino)-4-amino-5- or -6-methoxybenzene - 3 - sulphonic acid, 42 parts of 3'- or -4'-acetoacetylamino-4-amino-3-methyl-1.1'-diphenyl urea-5-sulphonic acid, 43.6 parts of 3'-acetoacetylamino - 4 - amino-2- or -3-methoxy-1.1'-diphenyl urea-5-sulphonic acid, dyestuffs are obtained which have a similar shade and similar good properties.

*Example 5*

21.6 parts of 2-amino-1-hydroxybenzene-4-sulphonic acid-dimethylamide are diazotised in the usual way and the diazo compound is poured into a solution of 40.6 parts of 4'-acetoacetylamino-4-amino-1.1'-diphenyl urea-3-sulphonic acid, 24 parts of sodium bicarbonate in 400 parts of water. The yellow monoazo dyestuff is isolated and further diazotised as described in Example 1. The neutralised diazonium compound is coupled with 29.7 parts of 1-amino-2-naphthylglycolic acid-6-sulphonic acid in the presence of 20 parts of sodium acetate, the disazo dyestuff which is formed is dissolved with 5 parts of caustic soda, 400 parts of sodium chloride are added and the whole is diazotised at 20° with 8.2 parts of sodium nitrite and 60 parts of concentrated hydrochloric acid. On completion of the diazotisation, the diazo compound is filtered off and coupled with a solution of 41.2 parts of 2-(2'.4'-dichlorobenzoylamino) - 6 - hydroxynaphthalene-8-sulphonic acid, 20 parts of sodium carbonate and 150 parts of pyridine. The green trisazo dyestuff of the formula:

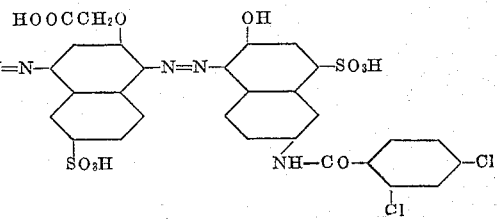
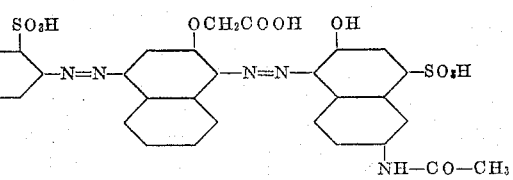

is isolated with a little sodium chloride. When dry, it is a dark powder which dissolves in water with a green and in concentrated sulphuric acid with a greenish-brown colour. The after-coppered dyeings on natural or regenerated cellulose fibres have excellent light and acid fastness properties.

If in this example, instead of 29.7 parts of 1-amino-2-naphthylglycolic acid-6-sulphonic acid the same number of parts of 1-amino-2-naphthylglycolic acid-7-sulphonic acid or 21.7 parts of 1-amino-2-naphthylglycolic acid or 25.3 parts of 1-amino-2-methoxynaphthalene-6- or -7-sulphonic acid or 26.7 parts of 1-amino-2-ethoxynaphthalene-6- or -7-sulphonic acid or 17.3 parts of 1-amino-2-methoxynaphthalene or 18.7 parts of 1-amino-2-ethoxynaphthalene, are used, dyestuffs of the same shade and similar properties are obtained.

Example 6

15.3 parts of 2-amino-1-hydroxybenzene-4-carboxylic acid in the form of the chlorohydrate are dissolved in 200 parts of water, 10 parts of concentrated hydrochloric acid are added and the whole is diazotised with 6.9 parts of sodium nitrite. This diazonium compound is coupled

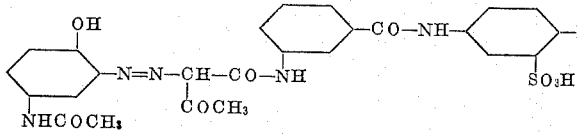

with a solution of 34.8 parts of 4'-acetoacetylamino-4-aminodiphenyl-3-sulphonic acid in the presence of 30 parts of sodium carbonate and the yellow monoazo dyestuff which is precipitated with sodium chloride is filtered off. The dyestuff is dissolved in 1000 parts of water and diazotised as described in Example 1. The diazo suspension which is acid to Congo red is neutralised with 4 parts of sodium carbonate, and poured into a solution of 21.7 parts of 1-amino-2-naphthylglycolic acid in 600 parts of water to which has been added 20 parts of sodium acetate. On completion of the coupling, 400 parts of sodium chloride are added and the disazo dyestuff is diazotised at 20–25° with 60 parts of concentrated hydrochloric acid and 8.2 parts of sodium nitrite. The filtered diazonium compound is mixed into a solution of 28.1 parts of 2-acetylamino-6-hydroxynaphthalene-8-sulphonic acid in 200 parts of water, 150 parts of pyridine and 20 parts of sodium carbonate. The trisazo dyestuff of the formula:

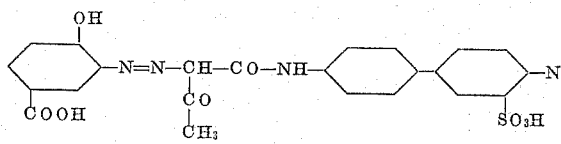

is isolated as described in Example 1. When dry it is a dark powder which dissolves in water with a yellowish-green and in concentrated sulphuric acid with a brown colour. It dyes cotton and staple rayon in olive green shades. The wet fastness of the after-coppered dyeings is very good.

If in this example the 15.3 parts of 2-amino-1-hydroxybenzene-4-carboxylic acid are replaced by the corresponding number of parts of another diazotised 2-amino-1-hydroxybenzene derivative such as is listed in Example 1, olive green dyestuffs are obtained which have similar properties.

Example 7

16.6 parts of 4-acetylamino-2-amino-1-hydroxybenzene are dissolved in 200 parts of water and 25 parts of concentrated hydrochloric acid and diazotised at 0° with 6.9 parts of sodium nitrite. The diazonium body is coupled with an alkaline solution of 39.1 parts of 5-(3'-acetoacetylaminobenzoylamino) - 2 - aminobenzene-

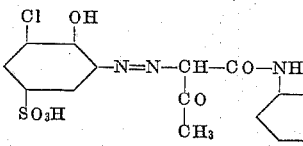

1-sulphonic acid as described in example 1. The yellow monoazo dyestuff is isolated with sodium chloride, dissolved in 1000 parts of water, 6.9 parts of sodium nitrite are added and the whole is added dropwise to 40 parts of hydrochloric acid. On completion of the diazotisation, the diazonium compound is filtered off and poured into a solution of 21.7 parts of 1-amino-2-naphthylglycolic acid to which 20 parts of sodium acetate have been added. The violet disazo dyestuff is further diazotised as described in Example 1 and after filtering, is coupled with 35.8 parts of 2-(3'-aminobenzoylamino)-6-hydroxynaphthalene-8-sulphonic acid with the addition of 20 parts of sodium carbonate and 150 parts of pyridine to form the green trisazo dyestuff of the formula:

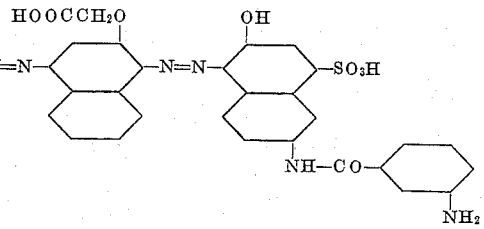

After filtering and washing away the adhering impurities, a dark powder is obtained which dissolves in water with a green and in concentrated sulphuric acid with a brown colour.

The dyestuff dyes natural or synthetic cellulose fibres a vivid green. The dyeings are made fast to washing, light and acid by after-treatment with copper salts on the fibre.

If in this example the 35.8 parts of 2-(3'-aminobenzoylamino)-6-hydroxynaphthalene-8-sulphonic acid are replaced by the corresponding number of parts of another of the acylated 2-amino-6-hydroxynaphthalene-8-sulphonic acids named in Example 3, and otherwise the same procedure is followed, dyestuffs are obtained which have a similar shade and similar properties.

Example 8

46.7 parts of 4'-(3''-acetoacetylaminobenzoylamino)-4-aminodiphenyl-3-sulphonic acid are dissolved in 400

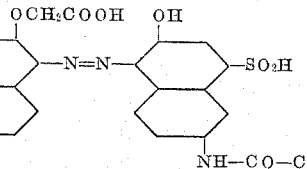

parts of water and 24 parts of sodium bicarbonate are added. The diazonium compound made up from 22.4 parts of 6-chloro-2-amino-1-hydroxybenzene-4-sulphonic acid which has been prepared in the usual way is added to this solution. The yellow monoazo dyestuff obtained is precipitated with sodium chloride and filtered off. The filter cakes are dissolved in 1000 parts of water and diazotised according to the method described in Example 1. After stirring for 4 hours, the neutralised suspension is poured into a solution of 29.7 parts of 1-amino-2-naphthylglycolic acid-7-sulphonic acid to which has been added 20 parts of sodium acetate. The disazo dyestuff obtained is violet and, with the addition of 400 parts of sodium chloride, is further diazotised with 8.2 parts of sodium nitrite and 60 parts of hydrochloric acid. It is filtered off and finally coupled with an aqueous solution of 34.3 parts of 2-benzoylamino-6-hydroxynaphthalene-8-sulphonic acid, 20 parts of sodium carbonate and 150 parts of pyridine. The green trisazo dyestuff of the formula:

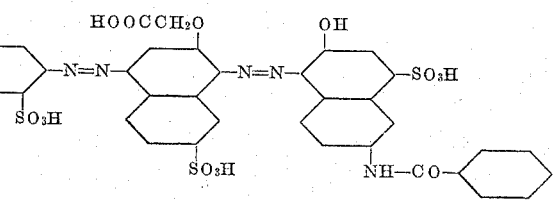

is precipitated with sodium chloride, filtered off and freed from impurities by washing. It is a dark powder which dissolves in water with a green colour and in concentrated sulphuric acid with a brown colour.

After treatment with copper sulphate, the green dyeings obtained therewith on cellulose fibres have very good fastness properties.

If instead of 46.7 parts of 4'-(3''-acetoacetylaminobenzoylamino)-4-aminodiphenyl-3-sulphonic acid, 48.3 parts of 4'-(4''-acetoacetylamino-3''-methylbenzoyl-amino)-4-aminodiphenyl-3-sulphonic acid or 48.2 parts of 4'-(3''- or 4''-acetoacetylaminophenylureido)-4-aminodiphenyl-3-sulphonic acid are used, or if instead of the 22.4 parts of 6-chloro-2-amino-1-hydroxybenzene-4-sulphonic acid equivalent parts of another of the 2-amino-1-hydroxybenzene compounds listed in Example 1 are used, analogous dyestuffs with similar properties are obtained.

20 parts of sodium acetate to form the violet disazo dyestuff. The reaction is made weakly acid with 5 parts of sodium carbonate to accelerate the reaction. The disazo dyestuff is diazotised according to the method given in Example 1. Finally, the isolated diazonium compound is coupled with a solution of 28.1 parts of 2-acetylamino-6-hydroxynaphthalene-8-sulphonic acid in 200 parts of water, 20 parts of sodium carbonate and 150 parts of pyridine to form the trisazo dyestuff of the formula:

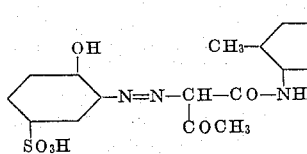
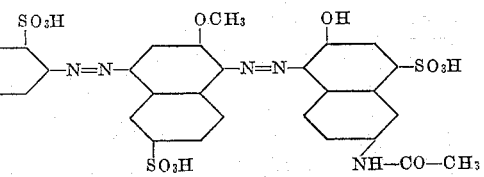

Example 9

18.7 parts of 2-amino-1-hydroxybenzene-4-methyl sulphone are diazotised as described in Example 1 and coupled with a soda alkaline solution of 40.6 parts of 3' - amino - 4 - acetoacetylamino - 1.1'-diphenyl urea - 3-sulphonic acid. The precipitated monoazodyestuff is filtered off, dissolved in 1000 parts of water and diazotised at 10–15° with 6.9 parts of sodium nitrite and 40 parts of concentrated hydrochloric acid. After 4 hours, the diazonium compound is made weakly acid to Congo red with 5 parts of sodium carbonate and added to a solution of 21.7 parts of 1-amino-2-naphthaleneglycolic acid in 600 parts of water with the addition of 20 parts of sodium acetate. The whole is stirred overnight and then the violet disazo dyestuff which forms is further diazotised the next day as described in Example 1. The dyestuff is isolated and coupled with 31.3 parts of 2-carbethoxyamino-6-hydroxynaphthalene-8-sulphonic acid in 200 parts of water, 150 parts of pyridine and 20 parts of sodium carbonate. After isolating and washing free from impurities, the trisazo dyestuff of the formula:

It is isolated with a little sodium chloride and when dry, it is a dark powder which dissolves in water with a green and in concentrated sulphuric acid with a yellowish-green colour. The dyeings on cellulose fibres are green and on after-treating with copper salts are fast to light, washing and acid.

If instead of 52.4 parts of 5-[4'-(3''-acetoacetylamino-4'' - methylbenzoylamino) - benzoylamino] - 2 - aminobenzene-1-sulphonic acid the same number of parts of 5-[4' - (4'' - acetoacetylamino-3'' - methylbenzoylamino)-benzoylamino]-2-aminobenzene-1-sulphonic acid or 51 parts of 5-[4'-(3''- or 4''-acetoacetylaminobenzoylamino)-benzoylamino]-2-aminobenzene-1-sulphonic acid or 52.4 parts of 5-[3'-(3''-acetoacetylamino-4''-methylbenzoylamino) - benzoylamino] - 2 - aminobenzene - 1 - sulphonic acid or 52.5 parts of 4'-(3''- or 4''-acetoacetylaminobenzoylamino)-4-amino-1.1'-diphenyl urea-3-sulphonic acid or 52.5 parts of 5-[4'-(3''- or 4''-acetoacetylamino - phenylureido) - benzoylamino] - 2 - aminobenzene-1-sulphonic acid, 53.9 parts of 5-[4'-(3''-acetoacetylamino - 4'' - methylphenylureido) - benzoylamino]-2-aminobenzene-1-sulphonic acid or the same

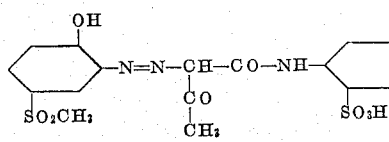
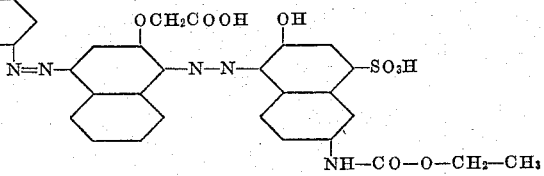

when dry is a dark powder which dissolves in water with a green and in concentrated sulphuric acid with a brown colour. Natural or regenerated cellulose fibres are dyed green. On after-treating with copper salts, the dyeings are made fast to light, washing and acid.

If in this example, the 18.7 parts of 2-amino-1-hydroxy-benzene-4-methyl sulphone are replaced by the corresponding number of parts of another 2-amino-1-hydroxybenzene derivative listed in Example 2, similar green dyestuffs with similar properties are obtained.

Example 10

18.9 parts of 3-amino-4-hydroxybenzene-1-sulphonic acid are dissolved at 20° in 180 parts of water with 4.1 parts of caustic soda, mixed with 30 parts of concentrated hydrochloric acid and diazotised by the addition of 6.9 parts of sodium nitrite. The diazonium compound is coupled with 52.4 parts of 5-[4'-(3''-acetoacetylamino-4'' - methylbenzoylamino) - benzoylamino] - 2 - aminobenzene-1-sulphonic acid in 600 parts of water and 30 parts of sodium carbonate to form a yellow monoazo dyestuff. After isolating this dyestuff, it is dissolved in 1000 parts of water and further diazotised with 6.9 parts of sodium nitrite and 40 parts of concentrated hydrochloric acid. The isolated diazonium compound is coupled with 25.3 parts of 1-amino-2-methoxynaphthalene-6-sulphonic acid in 200 parts of water in the presence of number of parts of 5-[4'-(4''-acetoacetylamino-3''-methylphenylureido) - benzoylamino] - 2 - aminobenzene-1-sulphonic acid are used, similar green trisazo dyestuffs with similar properties are obtained.

Example 11

18.8 parts of 2-amino-1-hydroxybenzene-4-sulphonic acid amide are diazotised and coupled with 39.1 parts of 5 - (3' - aminobenzoylamino) - 2 - acetoacetylaminobenzene-1-sulphonic acid in 400 parts of water with the addition of 24 parts of sodium bicarbonate to form the yellow monoazo dyestuff. This is precipitated with 200 parts of sodium chloride, dissolved at 60° in 1000 parts of water and mixed with 6.9 parts of sodium nitrite, after which the whole is poured into 40 parts of concentrated hydrochloric acid. On completion of the diazotisation, 4 parts of sodium carbonate are added until the reaction is weakly acid to Congo red and the suspension is poured into a solution of 29.7 parts of 1-amino-2-naphthylglycolic acid-6-sulphonic acid in 600 parts of water and 20 parts of sodium acetate. The violet disazo dyestuff is further diazotised as described in Example 1, filtered and poured into a solution of 39.3 parts of 2-(4'-chloro-3' - aminobenzoylamino) - 6 - hydroxynaphthalene - 8 - sulphonic acid, 20 parts of sodium carbonate in 200 parts of water and 150 parts of pyridine.

The green trisazo dyestuff of the formula:

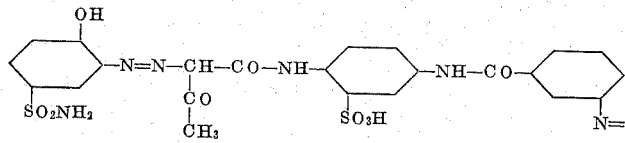

is isolated as described in Example 1. When dry, it is a dark powder which dissolves in water with a green and in concentrated sulphuric acid with a greenish-brown colour. It dyes natural or synthetic cellulose fibres green. On after-treating the dyeings with copper salts according to the usual methods, excellent light and wet fastness properties are obtained.

If in this example the 39.1 parts of 5-(3'-aminobenzoylamino)-2-acetoacetylaminobenzene-1-sulphonic acid are replaced by 40.5 parts of 5-(4'-amino-3'-methylbenzoylamino)-2-acetoacetylaminobenzene-1-sulphonic acid, 40.6 parts of 3'- or 4'-amino-4-acetoacetylamino-1.1'-diphenylurea-3-sulphonic acid, 42.6 parts of 5-(3'-amino-4'-chlorobenzoylamino) - 2 - acetoacetylaminobenzene - 1-sulphonic acid, 40.5 parts of 5-(3'-amino-4'-methylbenzoylamino) - 2 - acetoacetylaminobenzene - 1 - sulphonic acid, 42.1 parts of 5-(3'-amino-4'-methoxybenzoylamino) - 2 - acetoacetylaminobenzene - 1 - sulphonic acid, 45.3 parts of 5-(3'-aminobenzoylamino)-2-benzoylacetylaminobenzene-1-sulphonic acid, 46.7 parts of 5-(4'-amino-3'-methylbenzoylamino)-2-benzoylacetylaminobenzene-1-sulphonic acid, or 42 parts of 3'-amino-4 - acetoacetylamino - 3 - methyl - 1.1' - diphenylurea - 5 - sulphonic acid, similarly good dyestuffs of a similar shade are obtained.

*Example 12*

1.5 parts of the dyestuff obtained according to Example 1 are dissolved in a dyebath containing 3000 parts of water and 2 parts of soda. 100 parts of cotton are entered at 40–50°, the bath is heated to 90–95° within 30 minutes, 30 parts of sodium sulphate are added and dyeing is performed for 45 minutes at this temperature. After this time, the dyed goods are rinsed cold and aftertreated at 70° in a fresh bath with 2 parts of crystallised copper sulphate in 2000 parts of water and 2 parts of 30% acetic acid for half an hour. The goods are rinsed and dried in the usual way. The cottom is dyed in green shades which have excellent fastness properties.

What we claim is:

1. A trisazo dyestuff which corresponds to the formula

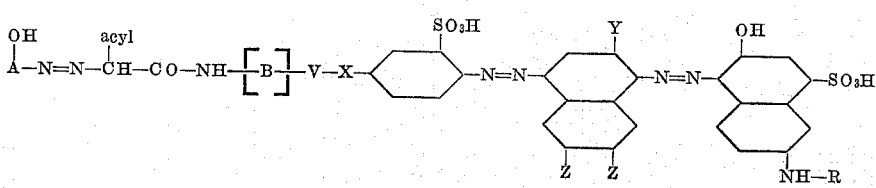

wherein A represents an aromatic radical of the benzene series containing the hydroxyl group in the o-position to the azo linkage, B stands for the group

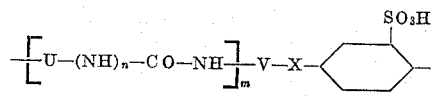

each of $n$ and $m$ is one of the numbers 0 and 1, each of U and V represents an aromatic radical of the benzene series in which the bonds shown stand in other than the o-position of said aromatic radicals and which are free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group, and R represents a carboxylic acid acyl radical bound directly to the adjacent —NH— group by the —CO— group.

2. A trisazo dyestuff which corresponds to the formula

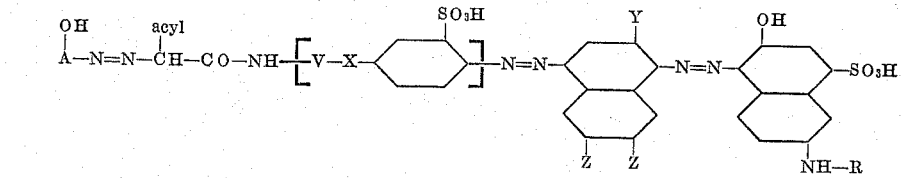

wherein A represents an aromatic radical of the benzene series containing the hydroxyl group in the o-position to the azo linkage, V represents an aromatic radical of the benzene series in which the bonds shown stand in other than the o-position of said aromatic radical and which is free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group, and R represents a carboxylic acid acyl radical bound directly to the adjacent —NH— group by the —CO— group.

3. A trisazo dyestuff which corresponds to the formula

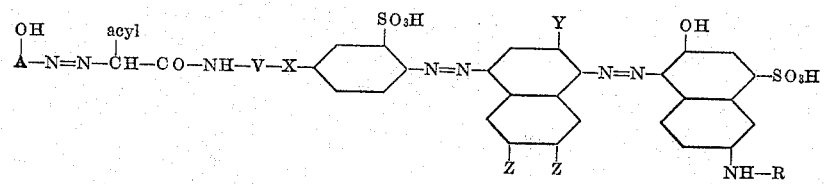

wherein A represents an aromatic radical of the benzene series containing the hydroxyl group in the o-position to the azo linkage, V represents an aromatic radical of the benzene series in which the bonds shown stand in m-position of said aromatic radical and which is free from carboxylic acid and sulphonic acid groups, X represents a bridging member selected from the group consisting of the direct carbon-carbon linkage and the groups —CO—NH— and —NH—CO—NH—, acyl represents a member selected from the group consisting of alkoyl and benzoyl radicals, Y represents a member selected from the group consisting of alkoxy and —OCH₂COOH groups, one Z represents hydrogen and the other Z represents a member selected from the group consisting of hydrogen and the sulphonic acid group, and R represents a carboxylic acid acyl radical bound directly to the adjacent —NH— group by the —CO— group.

4. The trisazo dyestuff of the formula:

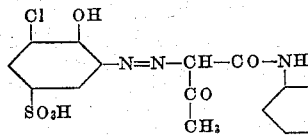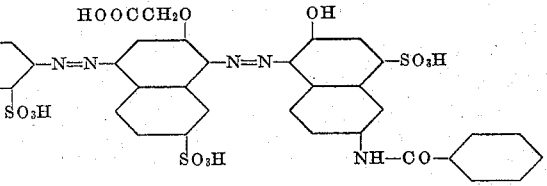

5. The trisazo dyestuff of the formula:

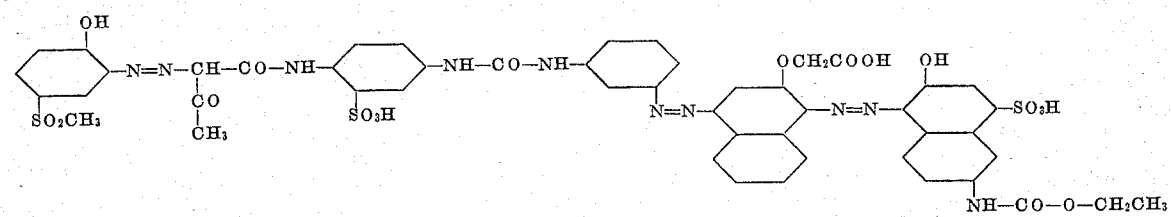

6. The trisazo dyestuff of the formula:

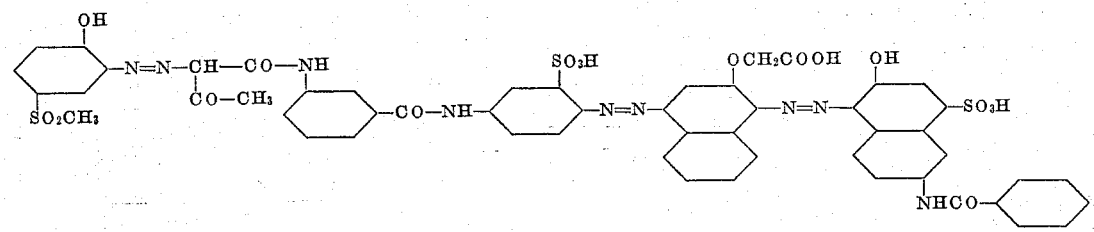

7. The trisazo dyestuff of the formula:

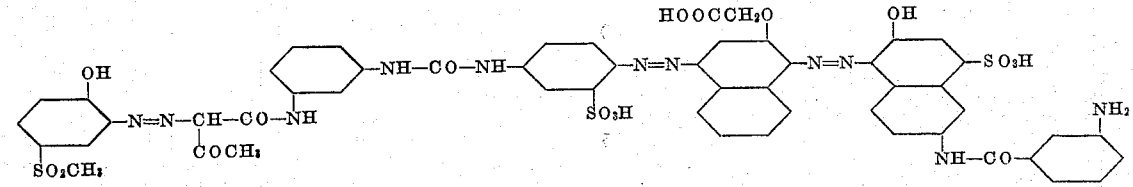

8. The trisazo dyestuff of the formula:

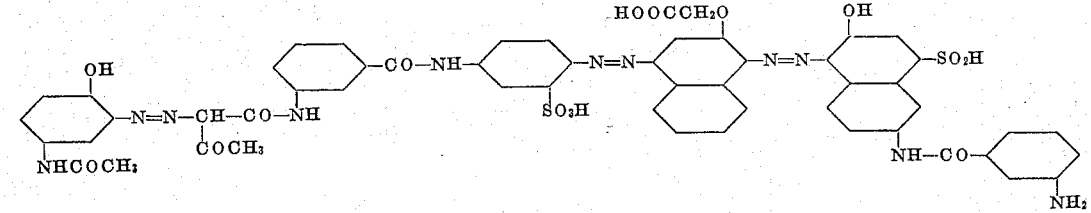

References Cited in the file of this patent

UNITED STATES PATENTS

| | | |
|---|---|---|
| 1,594,865 | Zitscher | Aug. 3, 1926 |
| 2,115,412 | Dahlen et al. | Apr. 26, 1938 |
| 2,515,546 | Bossard et al. | July 18, 1950 |

FOREIGN PATENTS

| | | |
|---|---|---|
| 367,675 | Great Britain | Feb. 25, 1932 |